(12) United States Patent
Dunn

(10) Patent No.: US 10,269,038 B2
(45) Date of Patent: *Apr. 23, 2019

(54) SYSTEM FOR TRACKING AND ANALYZING CONSUMPTION

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/495,086

(22) Filed: Apr. 24, 2017

(65) Prior Publication Data

US 2017/0228770 A1    Aug. 10, 2017

Related U.S. Application Data

(63) Continuation of application No. 14/740,997, filed on Jun. 16, 2015, now Pat. No. 9,633,366.

(Continued)

(51) Int. Cl.
*G06Q 30/06* (2012.01)
*G06Q 30/02* (2012.01)
(Continued)

(52) U.S. Cl.
CPC ......... *G06Q 30/0246* (2013.01); *G06F 3/147* (2013.01); *G06Q 10/087* (2013.01);
(Continued)

(58) Field of Classification Search
CPC ......... G09F 2023/0033; G09F 23/0058; G09F 23/06; G09F 23/065; G09F 9/35;
(Continued)

(56) References Cited

U.S. PATENT DOCUMENTS 3,629,972 A    12/1971    Rehberg et al.
4,040,726 A    8/1977    Paca
(Continued)

FOREIGN PATENT DOCUMENTS

CA    2815355 A1    5/2012
CN    101949526 A    1/2011
(Continued)

OTHER PUBLICATIONS

A. Vogler & H. Kunkley, Photochemistry and Beer, Jan. 1982, 3 Pages, vol. 59, No. 1.
Dave Ross, How Transmissive Film Works, 2008, 9 Pages.
Pilkington TEC Glass, for the Refrigeration Market, 2002, 2 Pages.

*Primary Examiner* — Hongmin Fan
(74) *Attorney, Agent, or Firm* — Standley Law Group LLP; Jeffrey S. Standley; Adam J. Smith

(57) ABSTRACT

A system for tracking and analyzing consumption of consumer goods is disclosed. A transparent electronic display displays advertising content and a sensor tracks whether any of the consumer goods have been selected. A CPU in electrical communication with the sensor and the transparent electronic display stores consumption data regarding the content displayed on the transparent electronic display when the sensor detects that any of the consumer goods have been selected.

8 Claims, 9 Drawing Sheets

Related U.S. Application Data

(60) Provisional application No. 62/013,917, filed on Jun. 18, 2014, provisional application No. 62/013,225, filed on Jun. 17, 2014, provisional application No. 62/012,559, filed on Jun. 16, 2014.

(51) Int. Cl.
  *G09G 3/00* (2006.01)
  *G06F 3/147* (2006.01)
  *G06Q 10/08* (2012.01)

(52) U.S. Cl.
  CPC ......... *G06Q 30/0242* (2013.01); *G09G 3/006* (2013.01); *G09G 2300/04* (2013.01); *G09G 2354/00* (2013.01); *G09G 2370/02* (2013.01); *G09G 2370/022* (2013.01); *G09G 2370/16* (2013.01)

(58) Field of Classification Search
  CPC .. A47F 3/0434; G09G 3/006; G09G 2300/04; G09G 2300/02; G09G 2300/022; G09G 2300/16; G06Q 30/0242
  See application file for complete search history.

(56) References Cited

U.S. PATENT DOCUMENTS

| | | |
|---|---|---|
| 4,299,092 A | 11/1981 | Ibrahim |
| 4,371,870 A | 2/1983 | Biferno |
| 4,853,678 A | 8/1989 | Bishop, Jr. et al. |
| 7,413,233 B1 | 8/2008 | Jung |
| 7,513,637 B2 | 4/2009 | Kelly et al. |
| 7,922,381 B2 | 4/2011 | Han et al. |
| 8,254,121 B2 | 8/2012 | Lee et al. |
| 8,417,376 B1 | 4/2013 | Smolen |
| 8,578,081 B1 | 11/2013 | Fils |
| 8,683,745 B2 | 4/2014 | Artwohl et al. |
| 8,982,013 B2 | 3/2015 | Sako et al. |
| 8,988,635 B2 | 3/2015 | Dunn et al. |
| 9,052,536 B2 | 6/2015 | Artwohl et al. |
| 9,155,405 B2 | 10/2015 | Artwohl et al. |
| 9,500,801 B2 | 11/2016 | Dunn |
| 9,500,896 B2 | 11/2016 | Dunn et al. |
| 9,514,661 B2 | 12/2016 | Riegel |
| 9,519,185 B2 | 12/2016 | Dunn et al. |
| 9,526,352 B2 | 12/2016 | Dunn et al. |
| 9,535,293 B2 | 1/2017 | Dunn |
| 9,633,366 B2 | 4/2017 | Dunn |
| 9,661,939 B2 | 5/2017 | Dunn et al. |
| 9,684,124 B2 | 6/2017 | Dunn |
| 9,733,420 B2 | 8/2017 | Dunn et al. |
| 2002/0064037 A1 | 5/2002 | Lee |
| 2002/0075552 A1 | 6/2002 | Poll et al. |
| 2002/0187575 A1 | 12/2002 | Maruyama et al. |
| 2003/0117790 A1 | 6/2003 | Lee et al. |
| 2004/0148055 A1* | 7/2004 | Shoenfeld ............ A61G 12/001 700/237 |
| 2004/0160388 A1 | 8/2004 | O'Keeffe |
| 2005/0265019 A1 | 12/2005 | Sommers et al. |
| 2006/0215958 A1 | 9/2006 | Yeo et al. |
| 2006/0284788 A1 | 12/2006 | Robinson et al. |
| 2007/0151274 A1 | 7/2007 | Roche et al. |
| 2007/0171647 A1 | 7/2007 | Artwohl et al. |
| 2007/0195535 A1 | 8/2007 | Artwohl et al. |
| 2007/0214812 A1 | 9/2007 | Wagner et al. |
| 2008/0024047 A1 | 1/2008 | Juo et al. |
| 2008/0055534 A1 | 3/2008 | Kawano |
| 2008/0094854 A1 | 4/2008 | Coleman et al. |
| 2008/0284942 A1 | 11/2008 | Mahama et al. |
| 2008/0295033 A1 | 11/2008 | Lee et al. |
| 2009/0002990 A1 | 1/2009 | Becker et al. |
| 2009/0015400 A1 | 1/2009 | Breed |
| 2009/0097227 A1 | 4/2009 | Kim et al. |
| 2009/0121970 A1 | 5/2009 | Ozbek |
| 2009/0278766 A1 | 11/2009 | Sako et al. |
| 2009/0300953 A1 | 12/2009 | Frisch et al. |
| 2010/0026912 A1 | 2/2010 | Ho |
| 2010/0162747 A1 | 7/2010 | Hamel et al. |
| 2010/0238394 A1 | 9/2010 | Dunn |
| 2010/0293827 A1 | 11/2010 | Suss et al. |
| 2010/0309687 A1 | 12/2010 | Sampsell et al. |
| 2011/0083460 A1 | 4/2011 | Thomas et al. |
| 2011/0116000 A1 | 5/2011 | Dunn et al. |
| 2011/0116231 A1 | 5/2011 | Dunn et al. |
| 2012/0020560 A1 | 1/2012 | Zarubinsky |
| 2012/0105424 A1 | 5/2012 | Lee et al. |
| 2012/0105428 A1 | 5/2012 | Fleck et al. |
| 2012/0206500 A1 | 8/2012 | Koprowski et al. |
| 2012/0206941 A1 | 8/2012 | He |
| 2012/0275477 A1 | 11/2012 | Berendt et al. |
| 2012/0287368 A1 | 11/2012 | Que et al. |
| 2013/0016296 A1 | 1/2013 | Fujita et al. |
| 2013/0063326 A1 | 3/2013 | Riegel |
| 2013/0120815 A1 | 5/2013 | Aspnes et al. |
| 2013/0151006 A1 | 6/2013 | Garson et al. |
| 2013/0158703 A1 | 6/2013 | Lin et al. |
| 2013/0208447 A1 | 8/2013 | Maslen |
| 2013/0211583 A1 | 8/2013 | Borra |
| 2013/0265525 A1 | 10/2013 | Dunn et al. |
| 2013/0271696 A1 | 10/2013 | Dunn |
| 2014/0062316 A1 | 3/2014 | Tischler et al. |
| 2014/0078407 A1 | 3/2014 | Green et al. |
| 2014/0085564 A1 | 3/2014 | Hendren et al. |
| 2014/0104538 A1 | 4/2014 | Park et al. |
| 2014/0137065 A1 | 5/2014 | Feng et al. |
| 2014/0144083 A1 | 5/2014 | Artwohl et al. |
| 2014/0204452 A1 | 7/2014 | Branson |
| 2014/0285732 A1 | 9/2014 | Tanabe et al. |
| 2014/0333541 A1 | 11/2014 | Lee et al. |
| 2015/0035432 A1 | 2/2015 | Kendall et al. |
| 2015/0177480 A1 | 6/2015 | Bullock et al. |
| 2015/0250021 A1 | 9/2015 | Stice et al. |
| 2015/0253612 A1 | 9/2015 | Hasegawa et al. |
| 2015/0300628 A1 | 10/2015 | Dunn et al. |
| 2015/0309263 A2 | 10/2015 | Abovitz et al. |
| 2015/0338715 A1 | 11/2015 | Shaefer et al. |
| 2015/0362667 A1 | 12/2015 | Dunn |
| 2015/0362768 A1 | 12/2015 | Dunn |
| 2015/0362792 A1 | 12/2015 | Dunn et al. |
| 2015/0363819 A1 | 12/2015 | Dunn |
| 2015/0366083 A1 | 12/2015 | Dunn et al. |
| 2016/0037657 A1 | 2/2016 | Yoshizumi |
| 2016/0061514 A1 | 3/2016 | Seo et al. |
| 2016/0091755 A1 | 3/2016 | Dunn |
| 2016/0095450 A1 | 4/2016 | Trulaske, Sr. |
| 2016/0103275 A1 | 4/2016 | Diaz et al. |
| 2016/0106231 A1 | 4/2016 | Dunn et al. |
| 2016/0192451 A1 | 6/2016 | Dunn et al. |
| 2017/0046991 A1 | 2/2017 | Riegel |
| 2017/0068042 A1 | 3/2017 | Dunn et al. |
| 2017/0068044 A1 | 3/2017 | Dunn |
| 2017/0099960 A1 | 4/2017 | Dunn et al. |
| 2017/0108735 A1 | 4/2017 | Dunn |
| 2017/0228770 A1 | 8/2017 | Dunn |
| 2017/0256115 A1 | 9/2017 | Diaz |

FOREIGN PATENT DOCUMENTS

| | | |
|---|---|---|
| CN | 202815379 U | 3/2013 |
| EP | 3155607 A1 | 4/2017 |
| JP | 2010171010 A | 8/2010 |
| JP | 5173088 B1 | 3/2013 |
| KR | 1020040045939 A | 6/2004 |
| KR | 20120044874 | 5/2012 |
| WO | WO2006055873 A2 | 5/2006 |
| WO | WO2010116202 A1 | 10/2010 |
| WO | WO2013056109 A1 | 4/2013 |
| WO | 2015195681 A1 | 12/2015 |
| WO | WO2015195681 A1 | 12/2015 |
| WO | WO2017151934 A1 | 9/2017 |

* cited by examiner

SYSTEM FOR TRACKING AND ANALYZING CONSUMPTION

CROSS-REFERENCE TO RELATED APPLICATIONS

This application is a continuation of U.S. Non-Provisional application Ser. No. 14/740,997 filed on Jun. 16, 2015, which claims the benefit of U.S. Provisional Application No. 62/013,917 filed on Jun. 18, 2014, U.S. Provisional Application No. 62/013,225 filed on Jun. 17, 2014, and U.S. Provisional Application No. 62/012,559 filed on Jun. 16, 2014. The disclosures of all aforementioned applications are herein incorporated by reference in their entirety.

TECHNICAL FIELD

Embodiments generally relate to systems for tracking and analyzing the use of transparent liquid crystal displays (LCD) within display cases.

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

An exemplary embodiment provides a system for tracking and analyzing display case usage. An exemplary display case contains a CPU and door sensor, as well as a connection to the internet or cellular network. Some display cases may also contain a temperature sensor. When the door is opened, an identifier for the image/video being currently shown is preferably stored at the CPU along with the date and time the door was opened. This data can be collected and transmitted via an internet/cellular network to an operations center having a CPU. In this way, the data can be analyzed to determine the traffic through the display case as well as the effectiveness of the images/videos being shown. By using the system and method described herein, the energy efficiency can be increased as well as the effectiveness of the advertisements.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
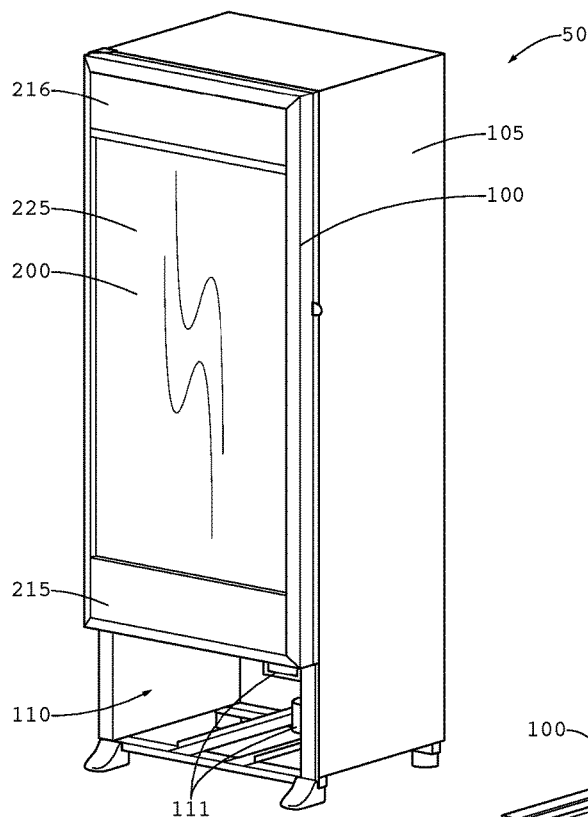
FIG. 1 is a perspective view of a refrigerated display case having a transparent LCD assembly.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a refrigerated display case 50 having a transparent LCD 200. Generally, the display case includes a housing 105, to which a door frame assembly 100 is fastened. In this embodiment, a cavity 110 is provided below the door frame assembly 100 where various electronic devices 111 for operating the transparent LCD assembly 200 can be located. The electrical devices 111 may include any or all of the following: power modules, timing and control board (TCON), video player, CPU, wireless transmitter/receiver, cellular data transmitter/receiver, and internet connectivity. At least some of the electrical devices 111 are in electrical communication with the transparent LCD 200.

Figure 2:
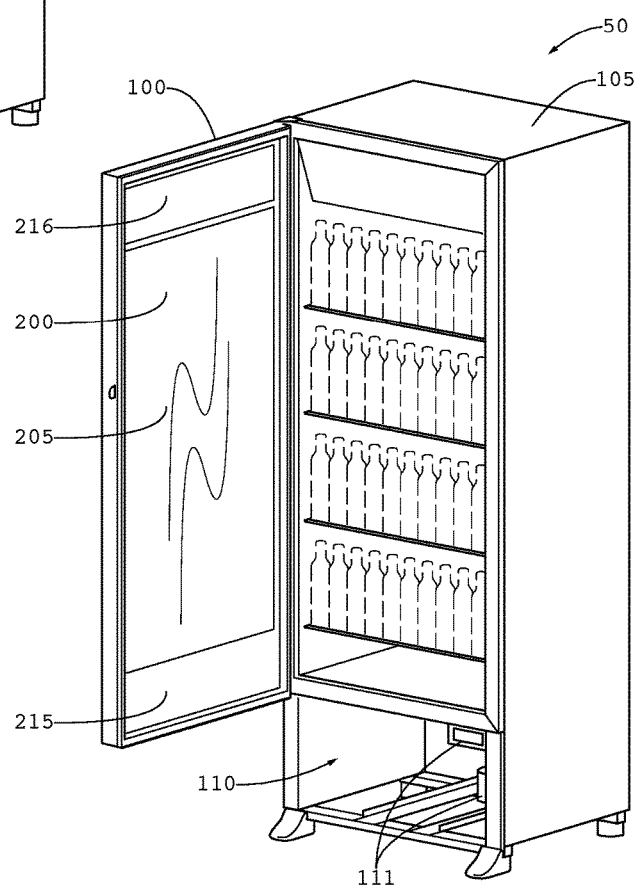
FIG. 2 is a perspective view of the refrigerated display case of FIG. 1 where the door has been opened.

FIG. 2 is a perspective view of the refrigerated display case of FIG. 1 where the door has been opened. The transparent LCD 200 is preferably sandwiched between a front glass 225 and rear glass 205. Also preferably sandwiched between the front and rear glass 225/205 is an upper plate 216 and a lower plate 215, each of which are preferably attached to the rear glass 205 such that heat from the plates can be conductively transferred to the rear glass 205 and removed by natural or forced convection.

In an exemplary embodiment, the upper and lower plates 216/215 are preferably bonded to the rear glass 205 through adhesive transfer tape. An exemplary adhesive transfer tape for this purpose would be 468 MP, available commercially from 3M™ of St. Paul, Minn. www.3M.com/converter. In order to illuminate the transparent LCD 200, one or more printed circuit boards (PCBs) each containing a plurality of LEDs is preferably in conductive thermal communication with either the upper, lower, or both plates. In this way, heat that is generated by the LEDs can be transmitted to the PCB and eventually transferring to the rear glass 205 where the heat can dissipate through natural or forced convection.

Figure 3:
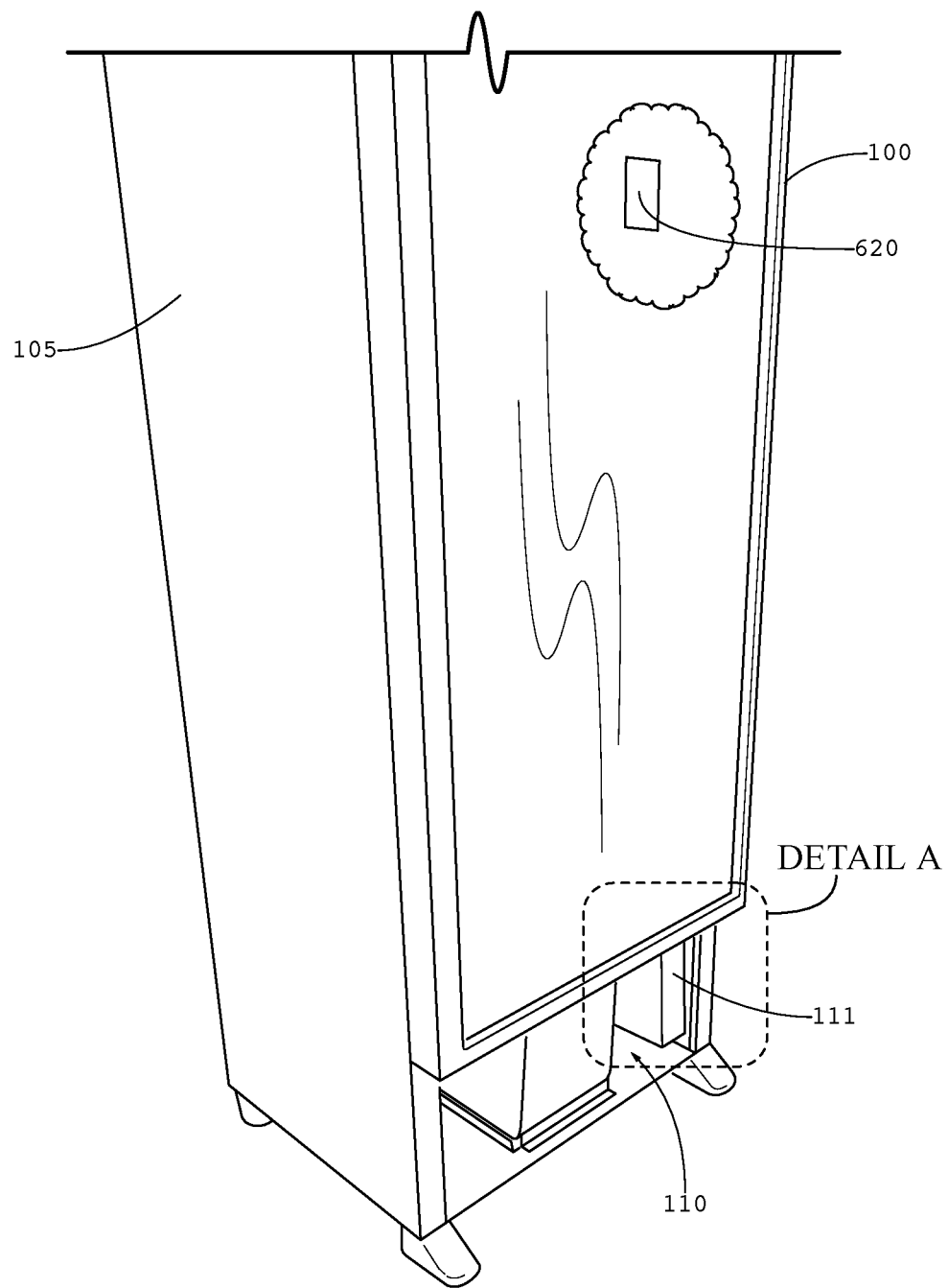
FIG. 3 is a perspective view of the refrigerated display case of FIG. 1 showing the cavity for electronic devices as well as the location of Detail A.
Figure 4:
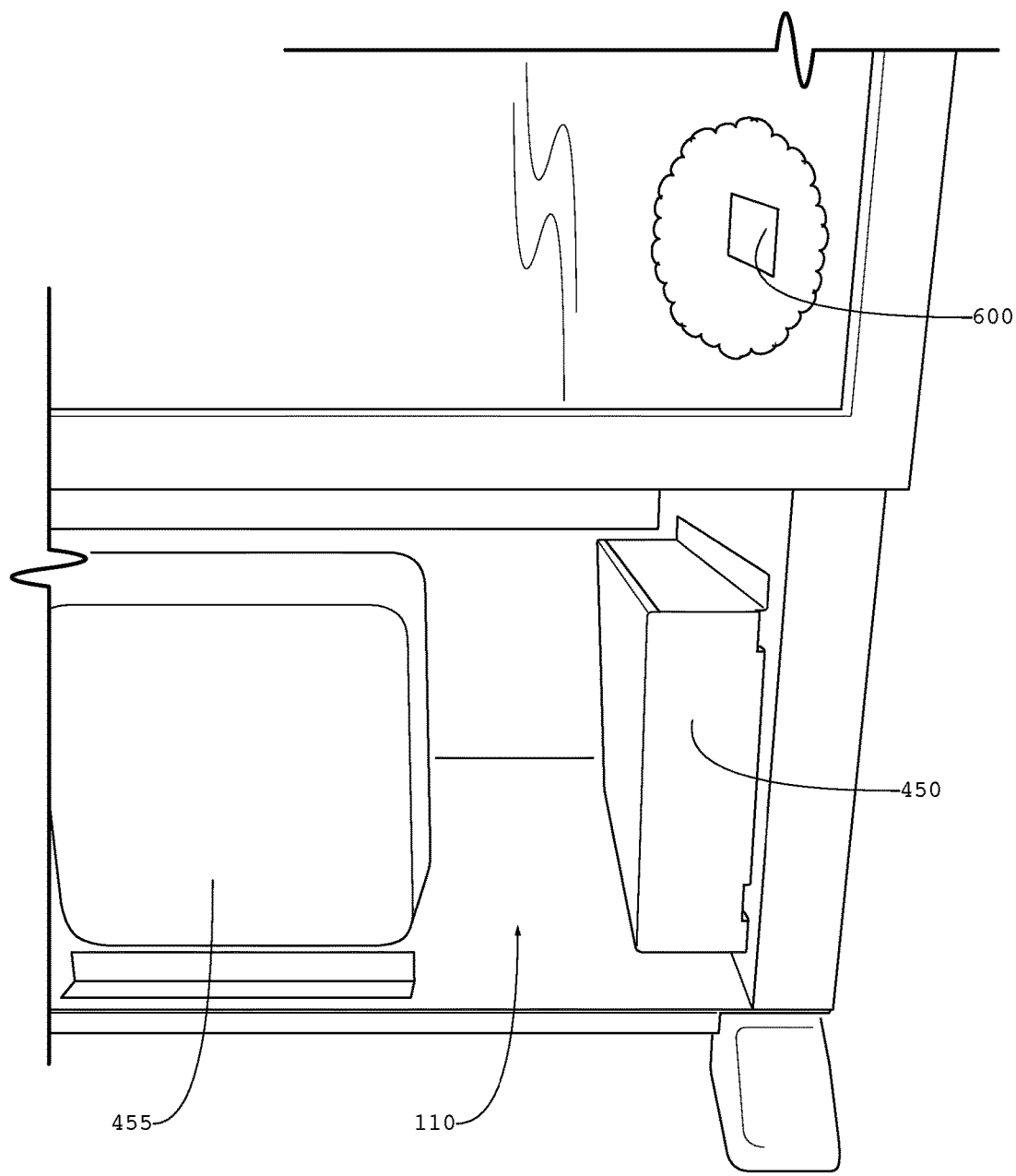
FIG. 4 is a front view of Detail A shown in FIG. 3.

FIG. 3 is a perspective view of the refrigerated display case of FIG. 1 showing the cavity for electronic devices as well as the location of Detail A. Also shown in this figure is the temperature sensor 620 which is in electrical communication with the CPU 455. The term CPU as used herein would preferably contain a microprocessor capable of executing software logic along with RAM storage as well as hard drive electronic storage. FIG. 4 is a front view of Detail A shown in FIG. 3. Here, a wireless transmitter/receiver 450 is shown within the cavity 110 as well as a CPU 455. Also shown here is a door sensor 600 which is positioned to determine whether the door is currently open or not. The door sensor 600 is preferably in electrical communication with the CPU 455, which contains an electrical connection to either an internet or satellite network.

Figure 5:
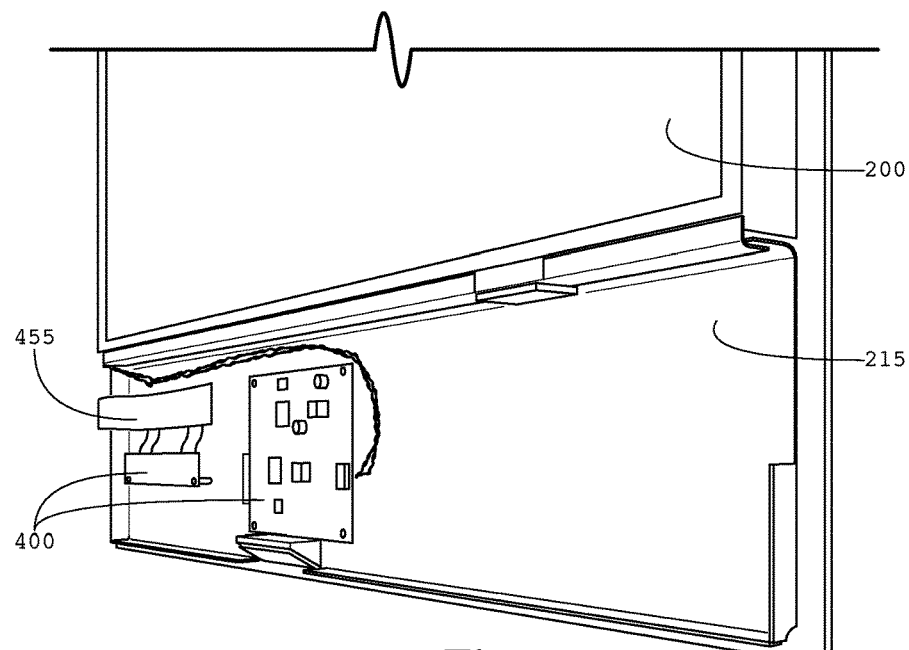
FIG. 5 is a perspective view showing a lower mounting plate and various electronic devices.

FIG. 5 is a perspective view showing a lower mounting plate 215 and various electronic devices 400 in electrical communication with the LCD 200. A second wireless transmitter/receiver 455 is positioned on the lower mounting plate 215 and communicates electronically with the wireless transmitter/receiver 450 shown within the cavity 110. A plurality of different signals can be transmitted between the two wireless devices 450/455 including but not limited to: image/video data, visual alerts, image inspection/test patterns, temperature of the display case, and feedback data from the LCD 200 such as brightness, color saturation, color temperature, gamma, and contrast ratio.

Figure 6:
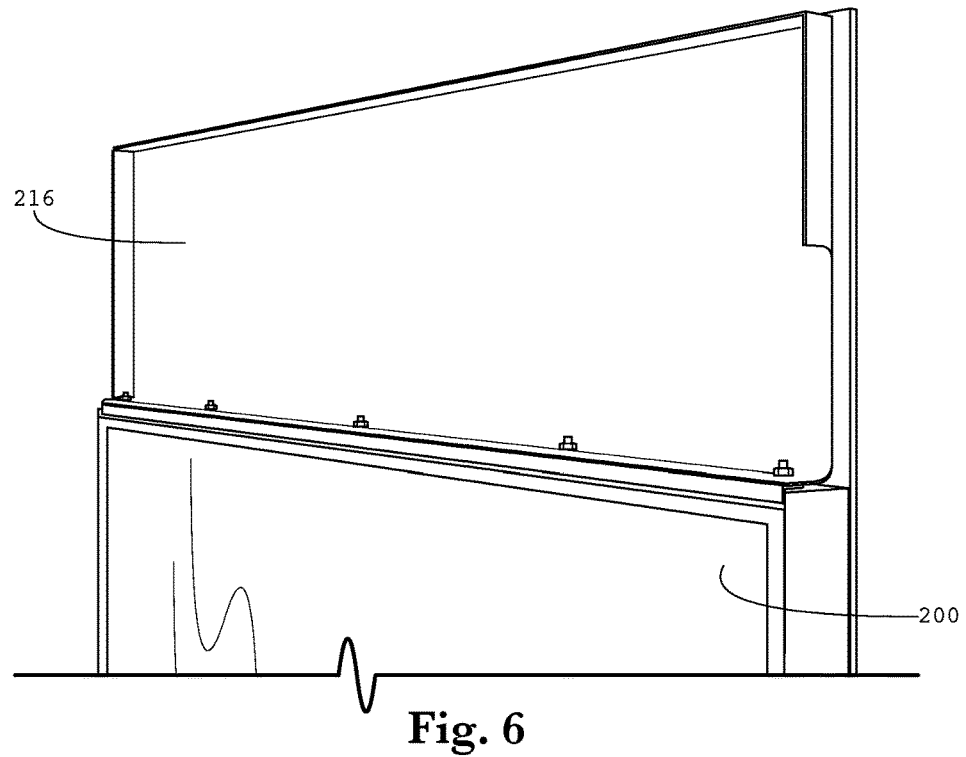
FIG. 6 is a perspective view showing an upper mounting plate.

As noted above, preferably the electronic devices 400 are in conductive thermal communication with the plate 215 which is preferably bonded to and in conductive thermal communication with the rear glass 205 so that heat generated by the electronic devices 400 can be removed. Similarly, FIG. 6 is a perspective view showing the upper mounting plate 216, which can also be used to mount various electronic devices and is also preferably bonded to and in conductive thermal communication with the rear glass 205.

Figure 7:
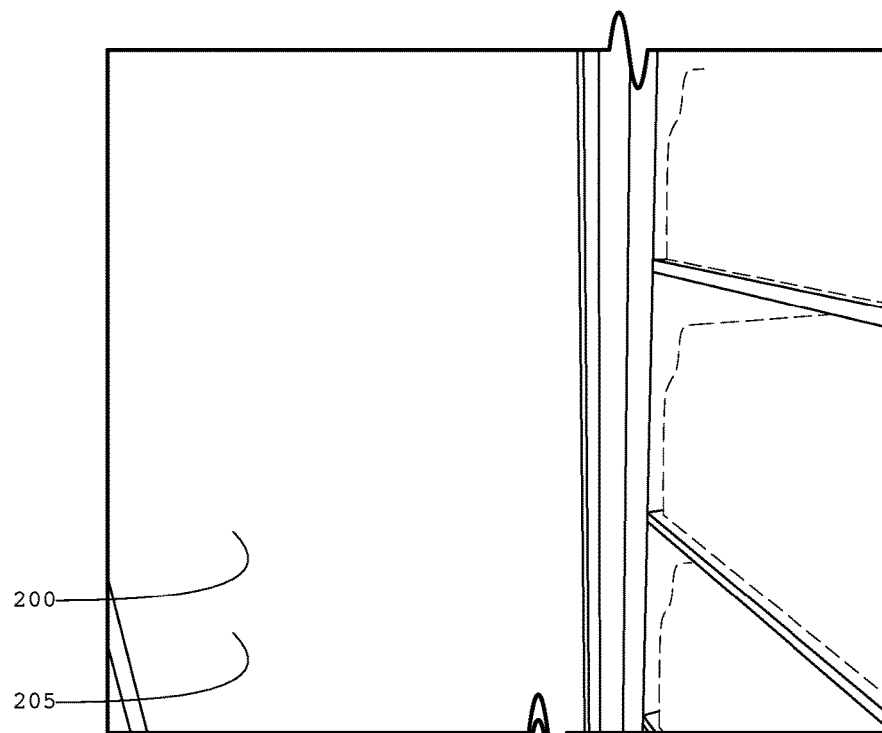
FIG. 7 is a perspective view of the display case looking at the vertical interior door jamb.
Figure 8:
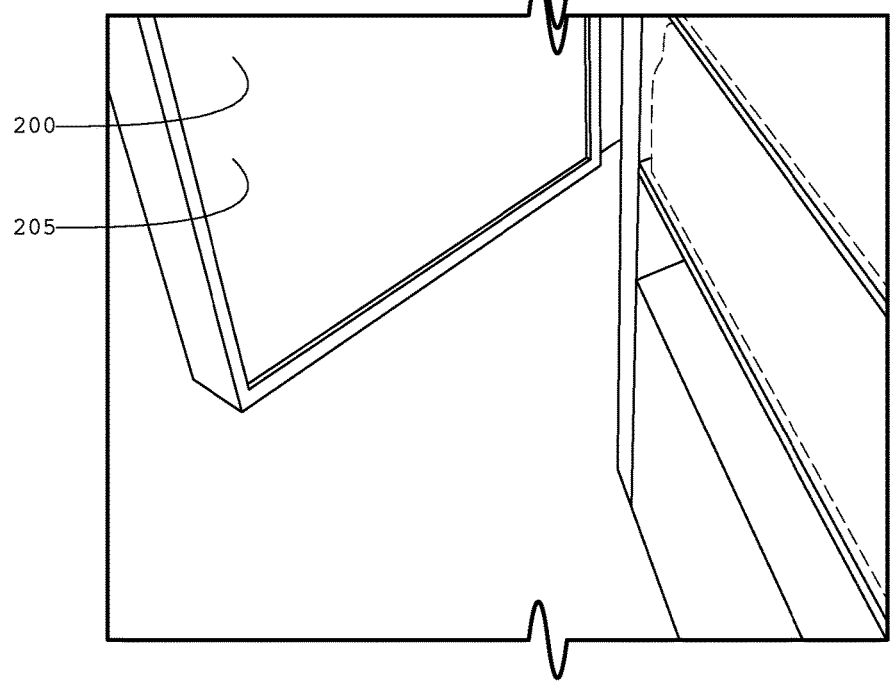
FIG. 8 is a perspective view of the display case looking at the horizontal bottom edge of the door and door frame.

FIG. 7 is a perspective view of the display case looking at the vertical interior door jamb. FIG. 8 is a perspective view of the display case looking at the horizontal bottom edge of the door and door frame. As can be observed in these Figures, no wiring is necessary to run the signals for the various data laid out above between the wireless devices 450/455. Not only does this provide an aesthetically pleasing look, but it also prevent wires from being tampered with or harmed through use of the display case or through the malicious intent of the general public.

The wireless devices 450/455 can operate under any form of wireless networking technology, including but not limited to: WPAN, WLAN, a wireless mesh network, or GAN. Specifically regarding the architecture for a WLAN network, these could include but are not limited to stations, basic service set, extended service set, and a distribution system. Further regarding the types of wireless LANs, these could include but are not limited to peer-to-peer, bridge, and a wireless distribution system. Any form of general encryption method can be used with the exemplary embodiments herein.

The embodiments of the wireless communication and transparent LCD system described herein can be used with any number of display case designs, either temperature controlled or not, and with doors that open or glass that remains stationary. Although shown here with a transparent LCD, the wireless system could be used with a traditional backlit LCD as well.

Figure 9:
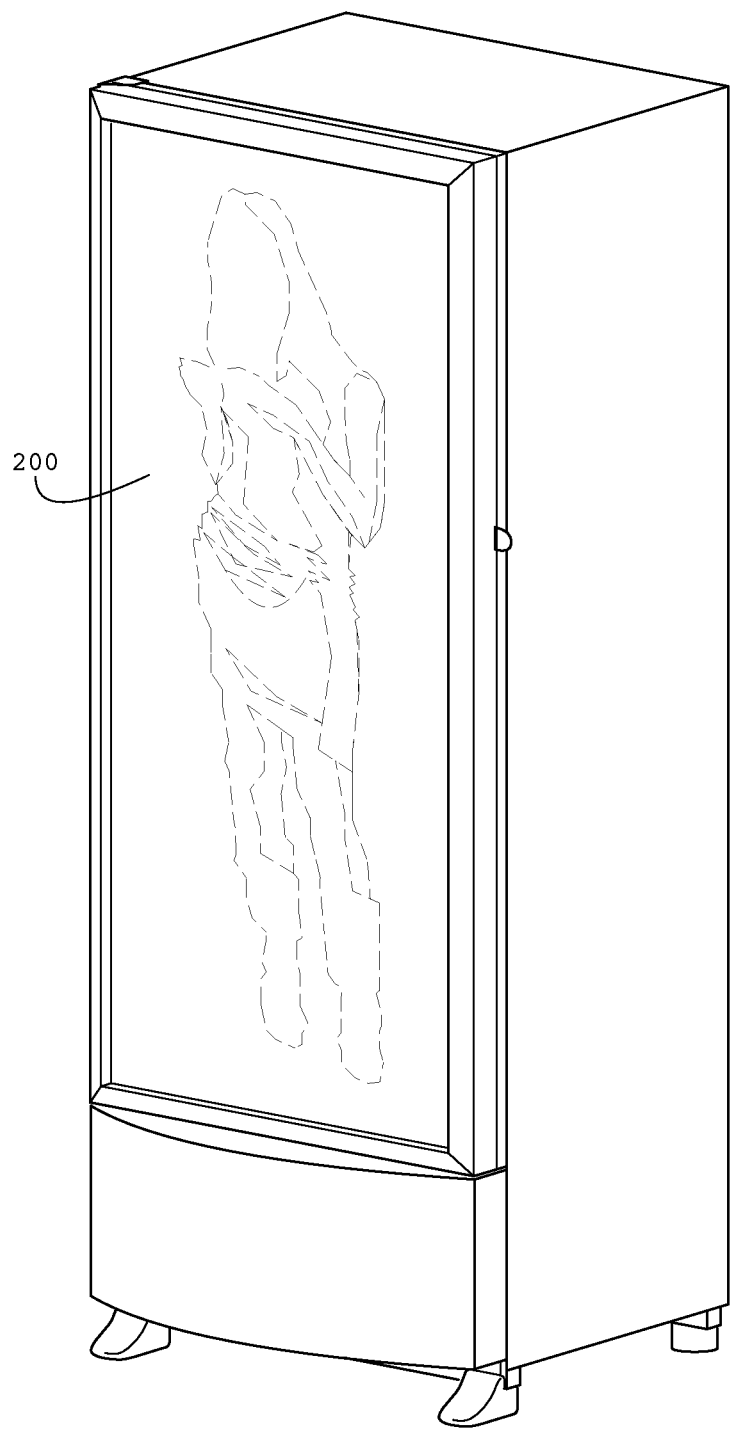
FIG. 9 is a perspective view of the display case where a video is being shown on the transparent LCD.

FIG. 9 is a perspective view of the display case where a video is being shown on the transparent LCD 200.

Figure 10:
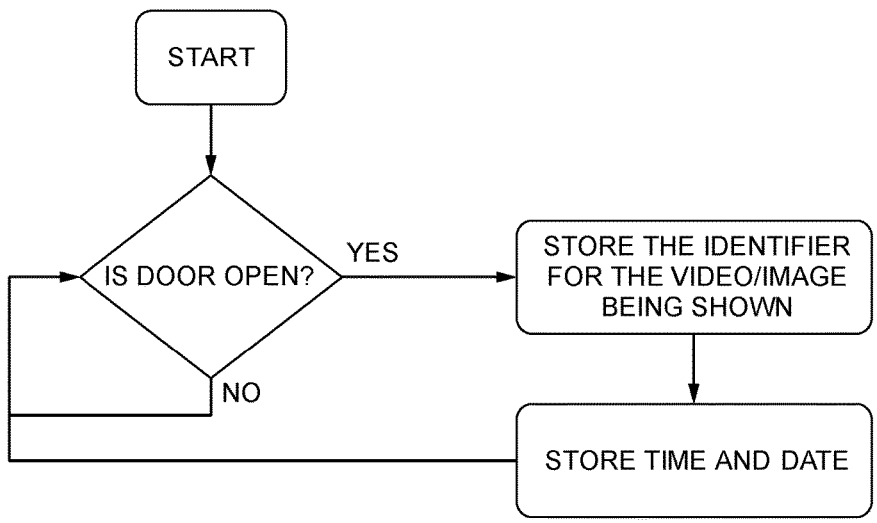
FIG. 10 is a logic flow chart for operating the hardware and software within the display case.

FIG. 10 is a logic flow chart for operating the hardware and software within the display case, specifically the CPU 455 and door sensor 600. By operating with this logic, the date/time as well as an identifier for the particular video/image being shown can be stored.

Figure 11:
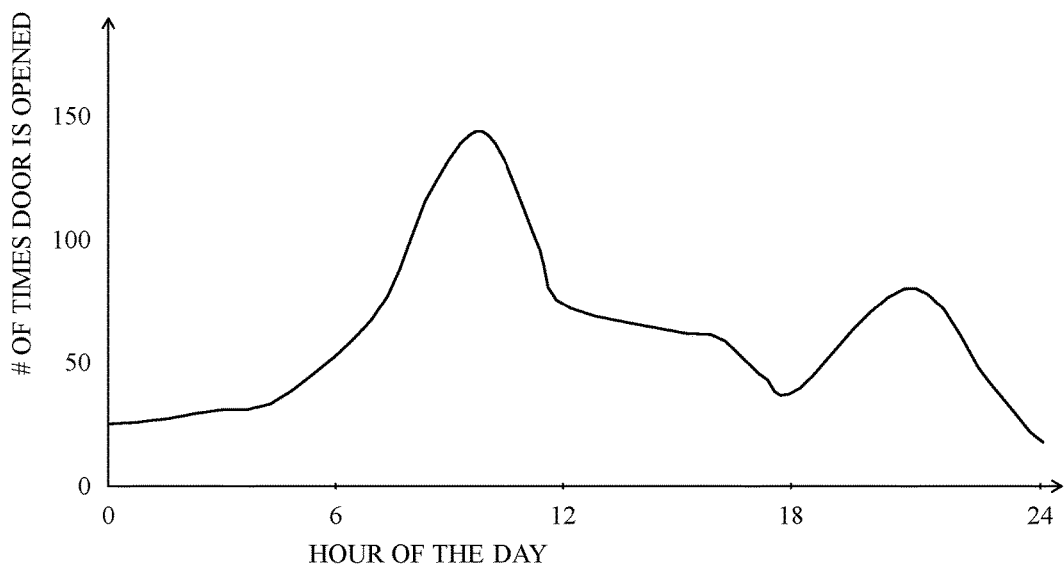
FIG. 11 is a graphical representation of the data collected by the hardware and software described above.

FIG. 11 is a graphical representation of the data collected by the hardware and software described above. Once the data is collected, low traffic and high traffic throughout the day can be analyzed. This traffic data can be useful in many ways. For example, it may be determined that it is preferred to hold the temperature of the display case at 32 degrees F. when the door is opened more than 100 times per hour, but only 35 degrees F. when the door is opened less than 50 times per hour. In this way, the usage rate and temperature of the display case can be correlated in order to save energy costs. For example, we know that we can now raise the temperature of the display case to 35 degrees F. from hours 0-6, 18, and 23-24 without risking damage to the contents. This requires less energy and can provide enormous cost savings when used for thousands of display cases.

Figure 12:
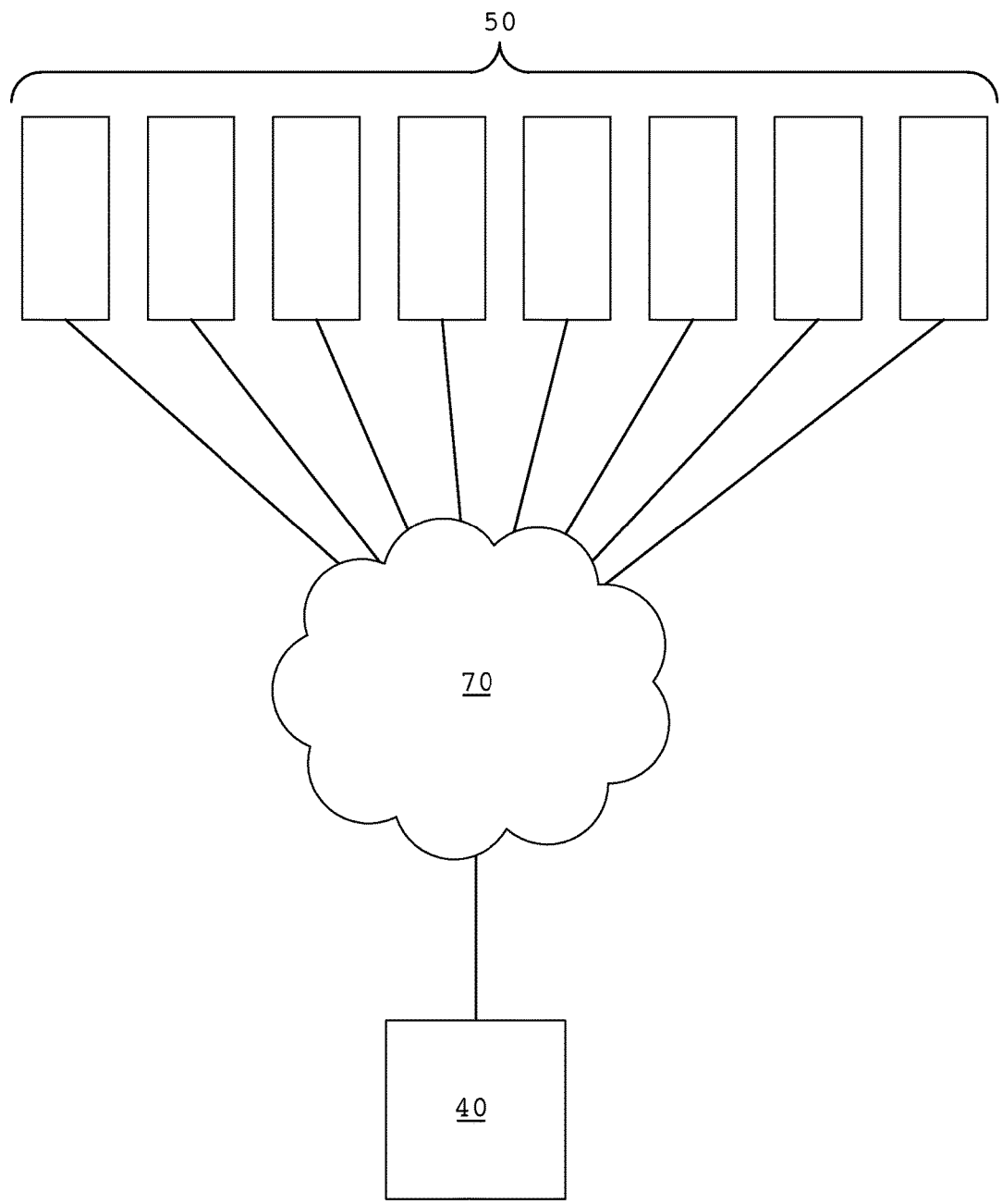
FIG. 12 is an electrical schematic representation of an exemplary embodiment of the system for tracking and analyzing display case usage.

FIG. 12 is an electrical schematic representation of an exemplary embodiment of the system for tracking and analyzing display case usage. Here, a plurality of display cases 50 are in communication with an internet/cellular network 70. Here, an operations center contains at least one CPU 40 which can communicate with the plurality of display cases 50 through the internet/cellular network 70. Generally speaking, if the internet/cellular network 70 is only internet, the CPU 455 and CPU 40 should each have some type of modem. Also generally speaking, if the internet/cellular network 70 is only cellular, the CPU 455 and CPU 40 should each have some type of cellular transmitter/receiver, and preferably a 4G cellular transmitter/receiver.

Figure 13:
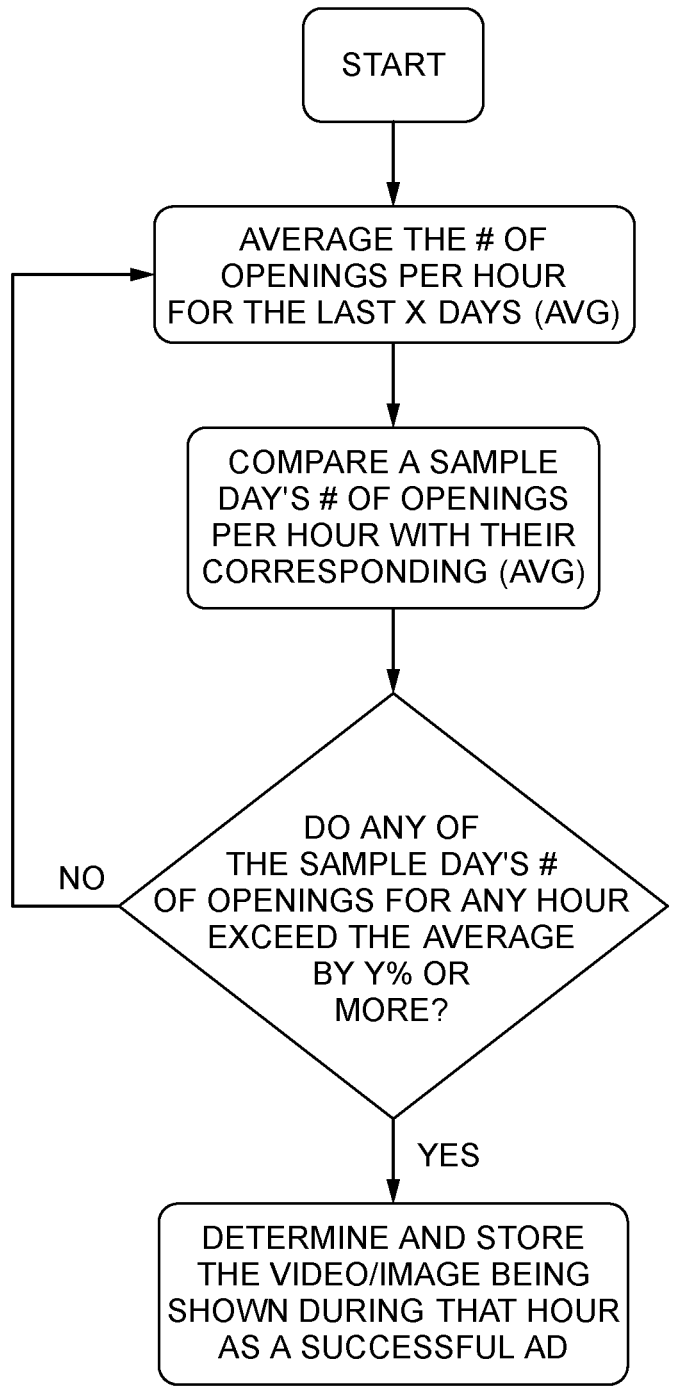
FIG. 13 is a logical flowchart that can be performed by the operations center and the computing devices utilized therein.

FIG. 13 is a logical flowchart that can be performed by the operations center and the computing devices utilized therein. Initially, the number of door openings per hour for each day can be averaged over the last X days (where X could be any number of days) to get an hourly average (AVG). Then, the number of openings per hour for any sample day can be compared with their corresponding AVG for that hour. Next, the logic can determine if the openings during any of the hours during the sample day exceed the hourly average by Y % or more (where Y can be set at any significant percentage depending on the data, but generally should be 15% or higher). If so, the identifier for the video/image being shown during that time is stored as a successful advertisement. In this way, advertisements that appear to create the most traffic within the cooler can be tracked or recorded so that these advertisements can be shown more often or so that future advertisements can be designed around the successful advertisements of the past. This provides the content providers with an unprecedented amount of control over their advertising, and specifically the effectiveness of their advertising.

It should be noted that, although the above embodiments deal mostly with the number of door openings per hour, this could be performed by the number of openings during any time interval, either in minutes, hours, full days, or any combination. The system could also be used to determine the number of openings during each video segment, average these values (optionally), standardize the averages based on how long the video's were to obtain a number of openings per second/minute, and/or determine which videos created the highest number of openings.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A system for tracking and analyzing consumption of consumer goods comprising:
    a display case configured to showcase the consumer goods;
    an access panel forming at least a portion of the display case;
    a transparent electronic display forming at least a portion of the access panel;
    a sensor configured to detect whether the access panel is open; and
    a CPU in electrical connection with the transparent electronic display and the sensor;
    wherein the CPU is configured to store consumption data indicating the content displayed on the transparent electronic display when the access panel is opened.

2. The system of claim 1, further comprising:
    a wireless transmitter/receiver in electrical connection with the CPU; and
    an operations center;
    wherein the CPU transmits consumption data to the operations center via the wireless transmitter/receiver.

3. The system of claim 2, wherein:
    the operations center comprises a second CPU configured to calculate a current average of the number of times the access panel has been opened over a specified period of time.

4. The system of claim 3, wherein:
    the second CPU is configured to compare the current average with a historical average of the number of times the access panel has been opened
    over a second specified period of time.

5. The system of claim 4, wherein:
    the operations center is configured to store data regarding the content displayed on the transparent electronic display when the current average exceeds the historical average.

6. The system of claim 1, wherein:
    the consumption data comprises the time and date the access panel was opened.

7. The system of claim 1, wherein:
    the consumption data comprises an identifier for the content displayed on the transparent electronic display when the access panel was opened.

8. The system of claim 1, further comprising:
    a front transparent panel; and
    a rear transparent panel;
    wherein the transparent electronic display is sandwiched between the front transparent panel and the rear transparent panel.

* * * * *